US012230129B2

(12) United States Patent
Zeiynali Farid et al.

(10) Patent No.: US 12,230,129 B2
(45) Date of Patent: Feb. 18, 2025

(54) MONITORING A TRAFFIC CONDITION OF STOPPED OR SLOW MOVING VEHICLES

(71) Applicant: Toyota Motor Engineering & Manufacturing North America, Inc., Plano, TX (US)

(72) Inventors: Yashar Zeiynali Farid, Berkeley, CA (US); Kentaro Oguchi, Mountain View, CA (US); Baik Hoh, Campbell, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 450 days.

(21) Appl. No.: 17/513,068

(22) Filed: Oct. 28, 2021

(65) Prior Publication Data
US 2023/0136374 A1 May 4, 2023

(51) Int. Cl.
*G08G 1/01* (2006.01)
*G08G 1/052* (2006.01)

(52) U.S. Cl.
CPC ......... *G08G 1/0141* (2013.01); *G08G 1/0116* (2013.01); *G08G 1/0133* (2013.01); *G08G 1/0145* (2013.01); *G08G 1/052* (2013.01)

(58) Field of Classification Search
CPC .. G08G 1/0141; G08G 1/0116; G08G 1/0133; G08G 1/0145; G08G 1/052;
(Continued)

(56) References Cited

U.S. PATENT DOCUMENTS 5,801,943 A * 9/1998 Nasburg ........... G08G 1/096775
340/910

6,411,328 B1 6/2002 Franke et al.
(Continued)

FOREIGN PATENT DOCUMENTS

| CN | 113313950 A * | 8/2021 |
| DE | 102007044558 A1 | 1/2009 |

(Continued)

OTHER PUBLICATIONS

B.-F. Wu and J.-H. Juang, "Adaptive Vehicle Detector Approach for Complex Environments," in IEEE Transactions on Intelligent Transportation Systems, vol. 13, No. 2, pp. 817-827, Jun. 2012, doi: 10.1109/TITS.2011.2181366. (Year: 2012).*

O. Perkasa and D. H. Widyantoro, "Video-based system development for automatic traffic monitoring," 2014 International Conference on Electrical Engineering and Computer Science (ICEECS), Kuta, Bali, Indonesia, 2014, pp. 240-244, doi: 10.1109/ICEECS.2014.7045254. (Year: 2014).*

(Continued)

*Primary Examiner* — Marc Burgess
*Assistant Examiner* — Merritt E Levy
(74) *Attorney, Agent, or Firm* — Christopher G. Darrow; DARROW MUSTAFA PC (57) ABSTRACT

A system for monitoring a traffic condition can include a processor and a memory. The memory can store a preliminary operations module, a calculations module, and a communications module. The preliminary operations module can include instructions that cause the processor to obtain information about the traffic condition of stopped or slow moving vehicles. The calculations module can include instructions that cause the processor to: (1) define a monitoring zone that encloses the traffic condition and (2) determine, based on data about velocities of vehicles in the monitoring zone, that an error of a prediction of a position of a vehicle, associated with the traffic condition, is less than a threshold. The communications module can include instructions that cause the processor to: (1) receive the data and (2) cause, in response to a determination that the error (Continued)

is less than the threshold, the information to be communicated to vehicles.

20 Claims, 6 Drawing Sheets

(58) Field of Classification Search
CPC .............. G08G 1/0129; G08G 1/065; G08G 1/096725; G08G 1/096741; G08G 1/096775; G08G 1/164; G08G 1/0112; H04W 4/021; H04W 4/027; H04W 4/029; H04W 4/40
USPC ....................................................... 701/119
See application file for complete search history.

(56) References Cited

U.S. PATENT DOCUMENTS

| | | | |
|---|---|---|---|
| 8,160,805 B2* | 4/2012 | Downs | G08G 1/0112 701/117 |
| 8,260,498 B2 | 9/2012 | Deng | |
| 9,240,123 B2* | 1/2016 | Stenneth | G08G 1/0112 |
| 9,576,481 B2 | 2/2017 | Xu et al. | |
| 9,672,734 B1 | 6/2017 | Ratnasingam | |
| 9,805,594 B2* | 10/2017 | Buchholz | G08G 1/0141 |
| 10,692,365 B2 | 6/2020 | Ran et al. | |
| 10,977,943 B1* | 4/2021 | Hayward | G08G 1/096883 |
| 2004/0039517 A1 | 2/2004 | Biesinger et al. | |
| 2005/0216147 A1 | 9/2005 | Ferman | |
| 2007/0005231 A1 | 1/2007 | Seguchi | |
| 2007/0100537 A1* | 5/2007 | Parikh | G08G 1/20 701/117 |
| 2008/0071465 A1* | 3/2008 | Chapman | G01C 21/3691 701/117 |
| 2010/0099353 A1* | 4/2010 | Komori | G08G 1/096791 455/39 |
| 2011/0273322 A1* | 11/2011 | Melum | H04B 7/18506 342/42 |
| 2011/0310733 A1 | 12/2011 | Tzamaloukas et al. | |
| 2012/0065871 A1* | 3/2012 | Deshpande | G08G 1/0133 701/118 |
| 2014/0278052 A1 | 9/2014 | Slavin et al. | |
| 2014/0282093 A1* | 9/2014 | Burke | H04W 4/023 715/753 |
| 2015/0360697 A1* | 12/2015 | Baek | B60W 40/09 701/23 |
| 2016/0278153 A1* | 9/2016 | Kim | H01Q 3/34 |
| 2017/0270785 A1* | 9/2017 | Umehara | G08G 1/08 |
| 2018/0267537 A1 | 9/2018 | Kroop et al. | |
| 2018/0309592 A1* | 10/2018 | Stolfus | H04L 43/062 |
| 2019/0392712 A1 | 12/2019 | Ran et al. | |
| 2020/0005633 A1 | 1/2020 | Jin et al. | |
| 2020/0249029 A1* | 8/2020 | Schmidt | G07C 5/008 |
| 2020/0365015 A1* | 11/2020 | Nguyen | G08G 1/0129 |
| 2021/0065547 A1 | 3/2021 | Ran et al. | |
| 2023/0005364 A1* | 1/2023 | Walter | B60W 30/0956 |

FOREIGN PATENT DOCUMENTS

| | | | | |
|---|---|---|---|---|
| DE | 102011083677 A1 * | 4/2013 | ......... | G01C 21/3697 |
| EP | 0908861 A2 | 4/1999 | | |
| FR | 2866747 A1 * | 8/2005 | ............ | G07C 5/008 |
| KR | 20170064251 A * | 6/2017 | | |
| WO | WO-2018085107 A1 * | 5/2018 | ............ | G01S 13/66 |
| WO | 2018132378 A2 | 7/2018 | | |
| WO | WO-2021053393 A1 * | 3/2021 | ............ | B60W 40/04 |

OTHER PUBLICATIONS

R. Bauza, J. Gozalvez and J. Sanchez-Soriano, "Road traffic congestion detection through cooperative Vehicle-to-Vehicle communications," IEEE Local Computer Network Conference, Denver, CO, USA, 2010, pp. 606-612, doi: 10.1109/LCN.2010.5735780. (Year: 2010).*
Unknown, "Land guidance wrong," Aug. 24, 2019, 8 pages, found at https://support.google.com/maps/thread/12716772/landguidancewrong?hl=en.
Unknown, "Here Lanes," last accessed Aug. 31, 2021, 9 pages, found at https://www.here.com/platform/mapping/lanes.
Unknown, "Lane-level accuracy via fusion and hybridization algorithms for Gnss, Imu, Map and Computer Vision signal," Horizon 2020, 4 pages, found at https://inlane.eu/inlane-solution/architecture/.
Phate Zhang, "Gaode Map launches lane level navigation, Huawei phones first to be supported," Oct. 31, 2020, 3 pages, found at https://cntechpost.com/2020/10/31/gaode-map-launches-lane-level-navigation-huawei-phones-first-to-be-supported/.
Unknown, "Swift Navigation Demonstrates First-Ever Nationwide Lane-Level Precise Positioning With Ambitious Continental U.S. Drive Test," Swift Navigation, Jun. 9, 2020, 2 pages.
Brandon Russell, "Waze is getting lane guidance, trip suggestions, and traffic notifications," Sep. 15, 2020, 9 pages, found at https://www.xda-developers.com/waze-adds-lane-guidance-trip-suggestions-traffic-notifications/.
Unknown, "Lanes," last accessed on Aug. 31, 2021, 13 pages, found at https://wazeopedia.waze.com/wiki/USA/Lanes.
Amir Baruch, "Dynamic Lane Level Guidance—What It Is and Why You Should Care," Telenav, Mar. 19, 2019, 4 pages.
Seo et al., "Traffic State Estimation on Highway: A Comprehensive Survey," Journal of Annual Reviews in Control, vol. 43, 2017, pp. 128-151.
Unknown, "Innovative End-of-Queue Warning System Reduces Crashes Up to 45%," Sep. 2015, 2 pages.
Molzahn et al., "Jam Tail Warnings Based on Vehicle Probe Data," Transportation Research Procedia, vol. 27, 2017, pp. 808-815.
Clements et al., "Real-time Safety Alerts for Severe Weather and Jam Tails," Les Rencontres de la Mobilité Intelligente, 2016, pp. 1-8.
Dubbelman et al., "Low Cost GNSS and Computer Vision Fusion for Accurate Lane Level Navigation and Enhanced Automatic Map Generation," 2016, 20 pages.
Willem Strijbosch, "TomTom and inLane: Building Lane-Level Technology for Autonomous Driving," Jul. 19, 2018, 5 pages, found at https://www.linkedin.com/pulse/tomtom-inlane-building-lane-level-technology-driving-strijbosch.
Zadobrischi et al., "Traffic Flow Density Model and Dynamic Traffic Congestion Model Simulation Based on Practice Case with Vehicle Network and System Traffic Intelligent Communication," Symmetry 2020, pp. 1-19.
Di et al., "A Survey on Autonomous Vehicle Control in the Era of Mixed-Autonomy: From Physics-Based to AI-Guided Driving Policy Learning," Transportation Research Part C, 2021, vol. 125, Apr. 2021, pp. 1-50.
Unknown, "Your Personal Mobility Modeling Lab," Aimsun user manual, Aimsun Next, last accessed on Oct. 15, 2021, 14 pages, https://www.aimsun.com/aimsun-next/.
Jakob Erdmann, "SUMO's Lane-Changing Model," Modeling Mobility with Open Data, Mar. 2015, pp. 105-123.
Treiber et al., "Modeling lane-changing decisions with MOBIL," Traffic and Granular Flow, 2007, pp. 1-10.

* cited by examiner

| Position | Lane | Time | Velocity | Type |
|---|---|---|---|---|
| 100.50 Km | 2 | 20211014100 7 | 100 Km/hr | Passenger |
| 100.15 Km | 2 | 20211014100 3 | 90 Km/hr | Passenger |
| 100.60 Km | 3 | 20211014100 7 | 20 Km/hr | Semi-tractor-trailer truck |
| 100.55 Km | 3 | 20211014100 7 | 20 Km/hr | Passenger |
| 100.50 Km | 3 | 20211014100 8 | 20 Km/hr | Passenger |
| 100.40 Km | 3 | 20211014100 8 | 35 Km/hr | Passenger |

MONITORING A TRAFFIC CONDITION OF STOPPED OR SLOW MOVING VEHICLES

TECHNICAL FIELD

The disclosed technologies are directed to monitoring a traffic condition.

BACKGROUND

In order to optimize a flow of traffic, many roads can include more than one lane for a direction of traffic. With more than one lane for a direction of traffic, a vehicle can select to remain moving in a first lane or to change from moving within the first lane to moving within one of one or more other lanes. (Customarily, for a road with more than one lane for a direction of traffic, slower traffic moves in the right lane while faster traffic moves in the one or more other lanes.) Thus, having more than one lane for a direction of traffic can also allow a vehicle to select to change from moving within the first lane to moving within one of one or more other lanes in response to an existence of a traffic condition in the first lane. For example, the traffic condition can include an occurrence of stopped or slow moving vehicles. A traffic monitoring system can also be used to further optimize the flow of traffic. The traffic monitoring system can include a systematic process to collect, analyze, summarize, and retain vehicular traffic data.

SUMMARY

In an embodiment, a system for monitoring a traffic condition can include a processor and a memory. The memory can store a preliminary operations module, a calculations module, and a communications module. The preliminary operations module can include instructions that, when executed by the processor, cause the processor to obtain information about the traffic condition of stopped or slow moving vehicles. The calculations module can include instructions that, when executed by the processor, cause the processor to: (1) define a monitoring zone that encloses the traffic condition and (2) determine, based on data about velocities of vehicles in the monitoring zone, that an error of a prediction of a position of a vehicle, associated with the traffic condition, is less than a threshold. The communications module can include instructions that, when executed by the processor, cause the processor to: (1) receive the data and (2) cause, in response to a determination that the error is less than the threshold, the information to be communicated to vehicles.

In another embodiment, a method for monitoring a traffic condition can include obtaining, by a processor, information about a traffic condition of stopped or slow moving vehicles. The method can also include defining, by the processor, a monitoring zone that encloses the traffic condition. The method can also include receiving, by the processor, data about velocities of vehicles in the monitoring zone. The method can also include determining, by the processor and based on the data, that an error of a prediction of a position of a vehicle, associated with the traffic condition, is less than a threshold. The method can also include causing, by the processor and in response to a determination that the error is less than the threshold, the information to be communicated to vehicles.

In another embodiment, a non-transitory computer-readable medium for monitoring a traffic condition can include instructions that, when executed by one or more processors, cause the one or more processors to obtain information about a traffic condition of stopped or slow moving vehicles. The non-transitory computer-readable medium for monitoring a traffic condition can also include instructions that, when executed by one or more processors, cause the one or more processors to define a monitoring zone that encloses the traffic condition. The non-transitory computer-readable medium for monitoring a traffic condition can also include instructions that, when executed by one or more processors, cause the one or more processors to receive data about velocities of vehicles in the monitoring zone. The non-transitory computer-readable medium for monitoring a traffic condition can also include instructions that, when executed by one or more processors, cause the one or more processors to determine, based on the data, that an error of a prediction of a position of a vehicle, associated with the traffic condition, is less than a threshold. The non-transitory computer-readable medium for monitoring a traffic condition can also include instructions that, when executed by one or more processors, cause the one or more processors to cause, in response to a determination that the error is less than the threshold, the information to be communicated to vehicles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

"Connected vehicle" technologies can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network"

(V2N) technology. "Vehicle to Everything" (V2X) technology can integrate aspects of these individual communications technologies.

The directed technologies are directed to monitoring a traffic condition. The traffic condition can be one of stopped or slow moving vehicles. A traffic monitoring system can obtain information about the traffic condition. For example, the information about the traffic condition can be received from a vehicle in a vicinity of the traffic condition. For example, additional information can also be received from the vehicle in the vicinity of the traffic condition. The additional information can indicate that a determination, by the vehicle in the vicinity of the traffic condition, of an error of a prediction of a position of a vehicle, associated with the traffic condition, is greater than the threshold. Alternatively or additionally, for example, the traffic monitoring system can determine the information about the traffic condition.

The traffic monitoring system can define a monitoring zone that encloses the traffic condition. The traffic monitoring system can receive data about velocities of vehicles in the monitoring zone. For example, the data about the velocities of the vehicles in the monitoring zone can be received at a sampling frequency. For example, the sampling frequency can be caused to be set to a frequency at which a standard deviation, of data about the velocities of the vehicles in the monitoring zone, is less than a threshold deviation. The traffic monitoring system can determine, based on the data about the velocities of the vehicles in the monitoring zone, that an error of a prediction of a position of a vehicle, associated with the traffic condition, is less than a threshold. Alternatively, for example, the sampling frequency can be caused to be set to an inverse of a specific duration of time for which the error of the prediction of the position, at the specific duration of time later than a current time, of the vehicle, associated with the traffic condition, is less than the threshold.

The traffic monitoring system can cause, in response to a determination that the error, of the prediction of the position, is less than the threshold, the information about the traffic condition to be communicated to vehicles. For example, a component of a vehicle, of the vehicles that receive the information about the traffic condition, can use, in response to a receipt of the information about the traffic condition, the information about the traffic condition for an action to be performed by the vehicle.

Because the information about the traffic condition can be determined from data received about vehicles in a monitoring zone that encloses the traffic condition, a degree of utilization of a channel used for such communications by the traffic monitoring system of the disclosed technologies can be less than a degree of utilization of the channel by a conventional traffic monitoring system, which can determine the information about the traffic condition from data received about all vehicles being monitored, not just those vehicles within a defined monitoring zone.

Figure 1:
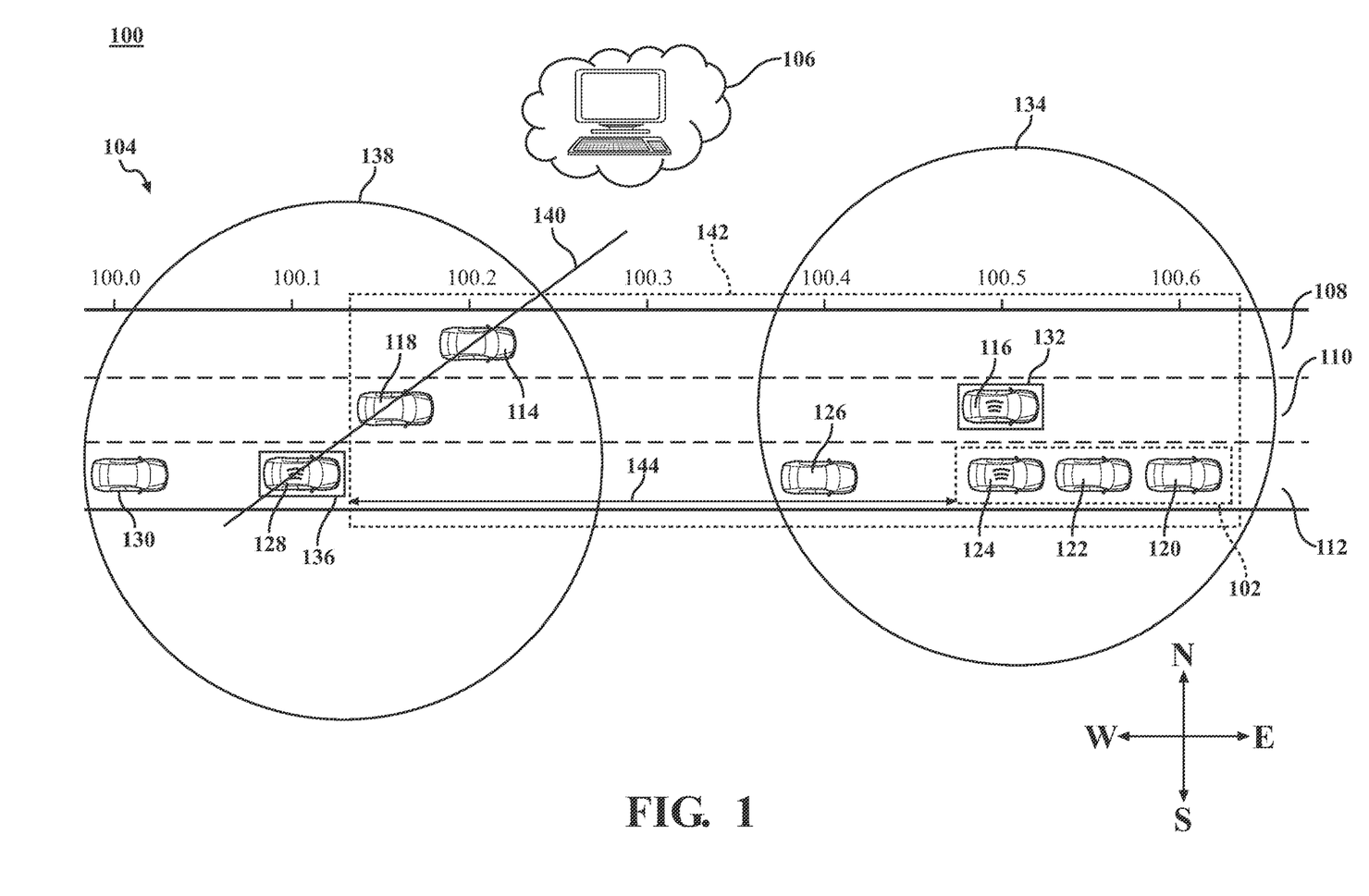
FIG. 1 includes a diagram that illustrates an example of an environment for monitoring a traffic condition, according to the disclosed technologies.

FIG. 1 includes a diagram that illustrates an example of an environment 100 for monitoring a traffic condition 102, according to the disclosed technologies. For example, the environment 100 can include a road 104 (disposed along a line of latitude) and a system 106 for monitoring traffic. For example, the road 104 can include, for traffic moving in an easterly direction, a first lane 108, a second lane 110, and a third lane 112. For example, the first lane 108 can include a first vehicle 114. For example, the second lane 110 can include a second vehicle 116 and a third vehicle 118. For example, the third lane 112 can include a fourth vehicle 120, a fifth vehicle 122, a sixth vehicle 124, a seventh vehicle 126, an eighth vehicle 128, and a ninth vehicle 130. For example, each of the second vehicle 116 and the eighth vehicle 128 can be a connected vehicle. For example, one or more sensors 132 can be disposed on the second vehicle 116 and can be configured to detect objects within a range defined by a first circle 134. For example, one or more sensors 136 can be disposed on the eighth vehicle 128 and can be configured to detect objects within a range defined by a second circle 138. For example, a line 140 can intersect the first vehicle 114, the third vehicle 118, and the eighth vehicle 128. For example, the traffic condition 102, which can be of stopped or slow moving vehicles, can include the fourth vehicle 120, the fifth vehicle 122, and the sixth vehicle 124.

Figure 2:
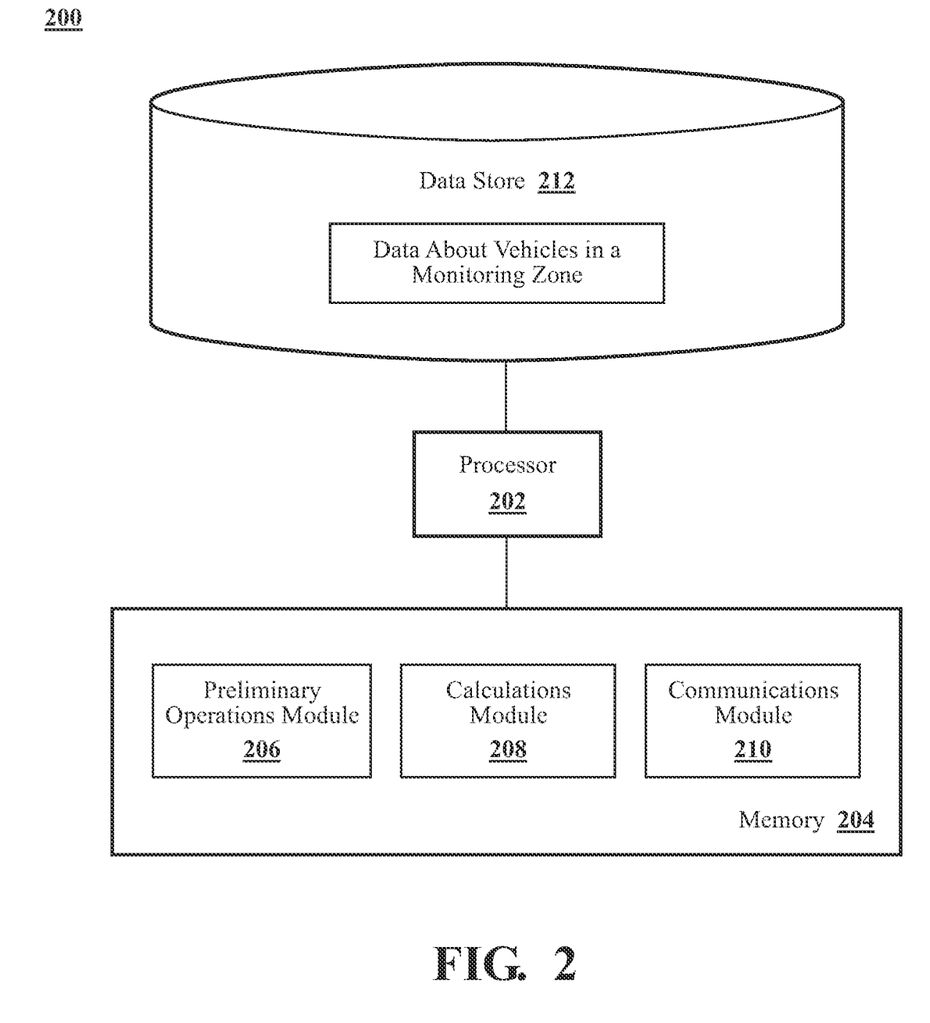
FIG. 2 includes a block diagram that illustrates an example of a system for monitoring a traffic condition, according to the disclosed technologies.

FIG. 2 includes a block diagram that illustrates an example of a system 200 for monitoring a traffic condition, according to the disclosed technologies. The system 200 can include, for example, a processor 202 and a memory 204. The memory 204 can be communicably coupled to the processor 202. The memory 204 can store, for example, a preliminary operations module 206, a calculations module 208, and a communications module 210. For example, the system 200 can be the system 106 illustrated in FIG. 1.

For example, the preliminary operations module 206 can include instructions that function to control the processor 202 to obtain information about the traffic condition. The traffic condition can be of stopped or slow moving vehicles.

For example, the instructions to obtain the information about the traffic condition can include instructions to receive, from a vehicle in a vicinity of the traffic condition, the information about the traffic condition. Additionally or alternatively, for example, the information about the traffic condition can be received from another source such as a roadside unit, a loop detector, or the like. Additionally, for example, the preliminary operations module 206 can further include instructions that function to control the processor 202 to receive, from the vehicle in the vicinity of the traffic condition or other source, additional information. The additional information can indicate that a determination, by the vehicle in the vicinity of the traffic condition, of an error of a prediction of a position of another vehicle, associated with the traffic condition, is greater than the threshold. Because the determination, by the vehicle in the vicinity of the traffic condition, of the error of the prediction of the position of the other vehicle, associated with the traffic condition, is greater than the threshold, the vehicle in the vicinity of the traffic condition can communicate the additional information to the system 200 so that the system 200 can initiate supplemental monitoring of the traffic condition so that a future error of a future prediction of a future position of the other vehicle, associated with the traffic condition, can be less than the threshold. With reference to FIG. 1, for example, the vehicle in the vicinity of the traffic condition 102 can be the second vehicle 116, and the other vehicle, associated with the traffic condition 102, can be the sixth vehicle 124.

Returning to FIG. 2, alternatively or additionally, for example, the instructions to obtain the information about the traffic condition can include instructions to determine the information about the traffic condition. For example, the instructions to determine the information about the traffic condition can include instructions to: (1) receive data about velocities of vehicles in a same lane, (2) determine, based on the data about the velocities of the vehicles in the same lane, if one or more velocities of one or more vehicles, of the vehicles in the same lane, is less than a threshold velocity, and (3) designate, in response to the one or more velocities of the one or more vehicles being less than the threshold velocity, the one or more vehicles as the traffic condition.

With reference to FIG. 1, for example, the system 106 can: (1) receive the data about the velocities of vehicles in the third lane 112 (e.g., the fourth vehicle 120, the fifth vehicle 122, the sixth vehicle 124, the seventh vehicle 126, the eighth vehicle 128, and the ninth vehicle 130), (2) determine, based on the data, that the velocities of the fourth vehicle 120, the fifth vehicle 122, and the sixth vehicle 124 are less than the threshold velocity, and (3) designate, in response to the velocities of the fourth vehicle 120, the fifth vehicle 122, and the sixth vehicle 124 being less than the threshold velocity, the fourth vehicle 120, the fifth vehicle 122, and the sixth vehicle 124 as the traffic condition 102.

Returning to FIG. 2, alternatively or additionally, for example, the instructions to determine the information about the traffic condition can further include instructions to: (1) determine a count of the one or more vehicles designated as the traffic condition and (2) identify, in response to the count being greater than a threshold count, one or more of: (a) a front vehicle of vehicles associated with the traffic condition or a back vehicle of the vehicles associated with the traffic condition.

With reference to FIG. 1, for example, the system 106 can: (1) determine the count of the one or more vehicles designated as the traffic condition 102 to be three (e.g., the fourth vehicle 120, the fifth vehicle 122, and the sixth vehicle 124) and (2) identify, in response to the count being greater than the threshold count (e.g., two), one or more of: (a) the front vehicle of vehicles associated with the traffic condition 102 (e.g., the fourth vehicle 120) or the back vehicle of the vehicles associated with the traffic condition 102 (e.g., the sixth vehicle 124).

Returning to FIG. 2, the calculation module 208 can include instructions that function to control the processor 202 to define a monitoring zone that encloses the traffic condition. For example, vehicles associated with the traffic condition can be in a lane of a road having a plurality of lanes for a specific direction of a flow of traffic. The instructions to define the monitoring zone can include instructions to set boundaries that include the plurality of lanes and extend from a front vehicle, of the vehicles associated with the traffic condition, to a distance behind a back vehicle of the vehicles associated with the traffic condition. Additionally, the communications module 210 can include instructions that function to control the processor 202 to cause information about the boundaries to be communicated to the vehicles. For example, a length of the distance behind the back vehicle can be based on an accuracy of the data received by the system 200. Alternatively, or additionally, for example, the length of the distance behind the back vehicle can be based on a quotient of a first number of vehicles divided by a second number of vehicles. The second number of vehicles can be a count of all the vehicles in the monitoring zone. The first number of vehicles can be a count of all the vehicles in the monitoring zone capable of communicating with the system 200. For example, the quotient can be referred to as a penetration rate.

With reference to FIG. 1, for example, the system 106 can define a monitoring zone 142 that encloses the traffic condition 102. For example, the vehicles associated with the traffic condition 102 (e.g., the fourth vehicle 120, the fifth vehicle 122, and the sixth vehicle 124) can be in the third lane 112 of the road 106 that has a plurality of lanes (e.g., the first lane 108, the second lane 110, and the third lane 112) for traffic moving in the easterly direction. The monitoring zone 142 can have boundaries that include the plurality of lanes (e.g., the first lane 108, the second lane 110, and the third lane 112) and extend from the front vehicle, of the vehicles associated with the traffic condition 102 (e.g., the fourth vehicle 120), to a distance 144 behind the back vehicle of the vehicles associated with the traffic condition 102 (e.g., the sixth vehicle 124). The system 106 can cause the information about the boundaries to be communicated to the vehicles (e.g., the second vehicle 116 and the eighth vehicle 128). The first number of vehicles can be the count of all the vehicles in the monitoring zone 142 capable of communicating with the system 106 (e.g., the third vehicle 118). The second number of vehicles can be the count of all the vehicles in the monitoring zone 142 (e.g., the first vehicle 114, the second vehicle 116, the third vehicle 118, the fourth vehicle 120, the fifth vehicle 122, the sixth vehicle 124, and the seventh vehicle 126). The quotient (e.g., the penetration rate) of the first number of vehicles (e.g., one) divided by the second number of vehicles (e.g., seven) can be 0.1429.

Returning to FIG. 2, the communications module 210 can include instructions that function to control the processor 202 to receive data about velocities of vehicles in the monitoring zone.

The calculations module 208 can include instructions that function to control the processor 202 to determine, based on the data about the velocities of the vehicles in the monitoring zone, that an error of a prediction of a position of a vehicle, associated with the traffic condition, is less than a threshold.

For example, the instructions to receive the data about the velocities of the vehicles in the monitoring zone can include instructions to receive, in signals, the data about the velocities of the vehicles in the monitoring zone. For example, the signals can further include: (1) data about positions of the vehicles in the monitoring zone, (2) data about identifications of lanes associated with the positions, and (3) data about times at which the signals were transmitted (e.g., timestamps). Additionally, for example, the signals can further include data about types of the vehicles in the monitoring zone.

For example, the instructions to receive the data about the velocities of the vehicles in the monitoring zone can include instructions to receive, from a set of specific vehicles, the data about the velocities of the vehicles in the monitoring zone. For example, a position of one or more specific vehicles, of the set of specific vehicles, can be outside of the monitoring zone. For example, the data about the velocities of the vehicles in the monitoring zone can exclude data about one or more vehicles of the vehicles in the monitoring zone. The one or more vehicles can be undetected by any sensor of any of the specific vehicles.

With reference to FIG. 1, for example, the system 106 can receive, from the set of specific vehicles (e.g., the second vehicle 116 and the eighth vehicle 128), the data about the velocities of the vehicles in the monitoring zone 142. For example, the position of the one or more specific vehicles (e.g., the eighth vehicle 128), of the set of specific vehicles, can be outside of the monitoring zone 142. For example, the data about the velocities of the vehicles in the monitoring zone 142 can exclude data about one or more vehicles (e.g., the first vehicle 114) of the vehicles in the monitoring zone 142. The one or more vehicles (e.g., the first vehicle 114) may be undetected by any sensor of any of the specific vehicles (e.g., the second vehicle 116 and the eighth vehicle 128). For example, the first vehicle 114 may be outside of the range (e.g., defined by the first circle 134) of the one or more sensors 132 disposed on the second vehicle 116. For example, the first vehicle 114 may be within the range (e.g., defined by the second circle 138) of the one or more sensors 136 disposed on the eighth vehicle 128, but a presence of the third vehicle 118 between the eighth vehicle 128 and the first vehicle 114 (e.g., along the line 140 that intersects the first vehicle 114, the third vehicle 118, and the eighth vehicle 128) may prevent the one or more sensors 136 from detecting the first vehicle 114.

Returning to FIG. 2, for example, the data about the velocities of the vehicles in the monitoring zone can exclude data about one or more vehicles between a front vehicle, of vehicles associated with the traffic condition, and a back vehicle of the vehicles associated with the traffic condition. Because the traffic condition can be of stopped or slow moving vehicles, the data about the one or more vehicles between the front vehicle and the back vehicle can be inferred from the data about the front vehicle and the data about the back vehicle. Having the system 200 configured to exclude, from the data about the velocities of the vehicles in the monitoring zone received by the system 200, the data about one or more vehicles between the front vehicle and the back vehicle can reduce a degree of utilization of a channel used for such communications by the system 200.

With reference to FIG. 1, for example, the data about the velocities of the vehicles in the monitoring zone 142 can exclude the data about the one or more vehicles (e.g., the fifth vehicle 122) between the front vehicle (e.g., the fourth vehicle 120), of the vehicles associated with the traffic condition 102, and the back vehicle (e.g., the sixth vehicle 124) of the vehicles associated with the traffic condition 102.

Returning to FIG. 2, for example, the system 200 can further include a data store 212. The data store 212 can be communicably coupled to the processor 202. The data store 212 can store, for example, the data about the vehicles in the monitoring zone.

Figure 3:
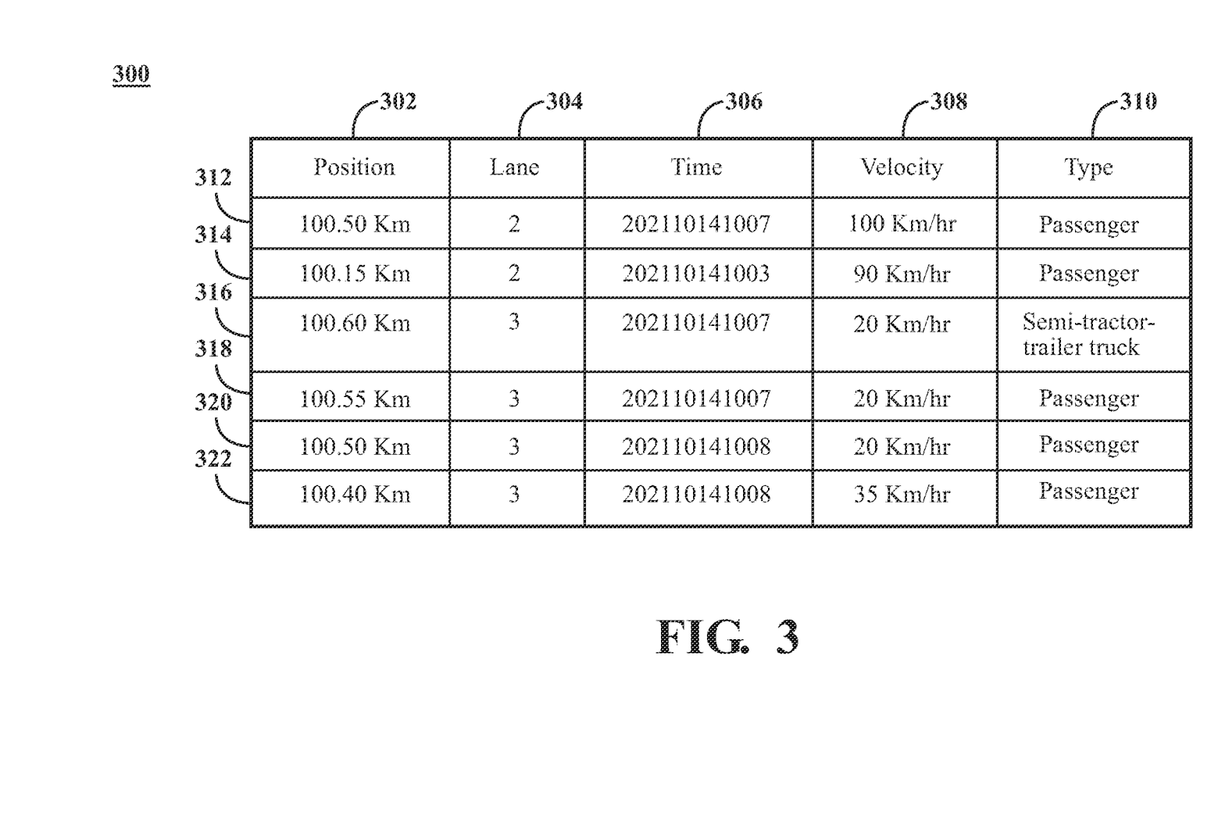
FIG. 3 is a diagram that illustrates a table of examples of data about vehicles in a monitoring zone, according to the disclosed technologies.

FIG. 3 is a diagram that illustrates a table 300 of examples of data about vehicles in a monitoring zone, according to the disclosed technologies. For example, the table 300 can be stored in the data store 212 illustrated in FIG. 2. For example, the table 300 can include fields for data about positions 302 of the vehicles in the monitoring zone, data about identifications of lanes 304 associated with such positions, data about times 306 at which such positions were determined (e.g., timestamps), data about velocities 308 of the vehicles in the monitoring zone, and data about types 310 of the vehicles in the monitoring zone. For example, the table 300 can include a first record 312 for the second vehicle 116, a second record 314 for the third vehicle 118, a third record 316 for the fourth vehicle 120, a fourth record 318 for the fifth vehicle 122, a fifth record 320 for the sixth vehicle 124, and a sixth record 322 for the seventh vehicle 126.

Returning to FIG. 2, for example, the instructions to receive the data about the velocities of the vehicles in the monitoring zone can include instructions to receive, at a sampling frequency, the data about the velocities of the vehicles in the monitoring zone.

In a configuration, for example, the calculations module 208 can further include instructions that function to control the processor 202 to: (1) calculate a standard deviation of the velocities of the vehicles in the monitoring zone, (2) determine if the standard deviation is greater than a threshold deviation, and (3) increase, in response to a determination that the standard deviation is greater than the threshold deviation, the sampling frequency.

Additionally, for example, the instructions to calculate the standard deviation, the instructions to determine if the standard deviation is greater than the threshold deviation, and the instructions to increase the sampling frequency can be performed in iterations. For example, the iterations can continue until the standard deviation is less than a threshold deviation. For example, the instructions to increase the sampling frequency can include instructions to increase, for an iteration of the iterations, the sampling frequency by a specific frequency amount.

Alternatively or additionally, in another configuration, for example, the calculations module 208 can further include instructions that function to control the processor 202 to: (1) produce, using a Kalman filter, the prediction of the position, at a specific duration of time later than a current time, of the vehicle associated with the traffic condition and (2) calculate the error of the prediction.

Additionally, for example, the calculations module 208 can further include instructions that function to control the processor 202 to: (1) determine a value for the specific duration of time so that the error is less than the threshold and (2) set the sampling frequency to be equal to an inverse of the specific duration of time for which the error is less than the threshold.

Having the system 200 configured to receive the data about the velocities of the vehicles in the monitoring zone at a sampling frequency no higher than necessary for the error of the prediction of the position of the vehicle, associated with the traffic condition, to be less than the threshold can reduce a degree of utilization of a channel used for such communications by the system 200.

The communications module 210 can include instructions that function to control the processor 202 to cause, in response to a determination that the error is less than the threshold, the information about the traffic condition to be communicated to the vehicles.

For example, a component of a vehicle, of the vehicles that receive the information about the traffic condition, can use, in response to a receipt of the information about the traffic condition, the information about the traffic condition for an action to be performed by the vehicle. For example, such a vehicle can be an automated vehicle. The component can include one or more vehicle systems of the automated vehicle. The one or more vehicle systems can cause an aspect of a movement of the automated vehicle to change based on the information about the traffic condition. Additionally or alternatively, for example, the component can include an output system of such a vehicle. The output system can cause the information about the traffic condition to be presented to an operator of the vehicle. For example, the output system can be one or more of a display, a speaker, a haptic device, or the like. For example, the display can be one or more of a console display, a head up display, or the like.

Figure 4A:
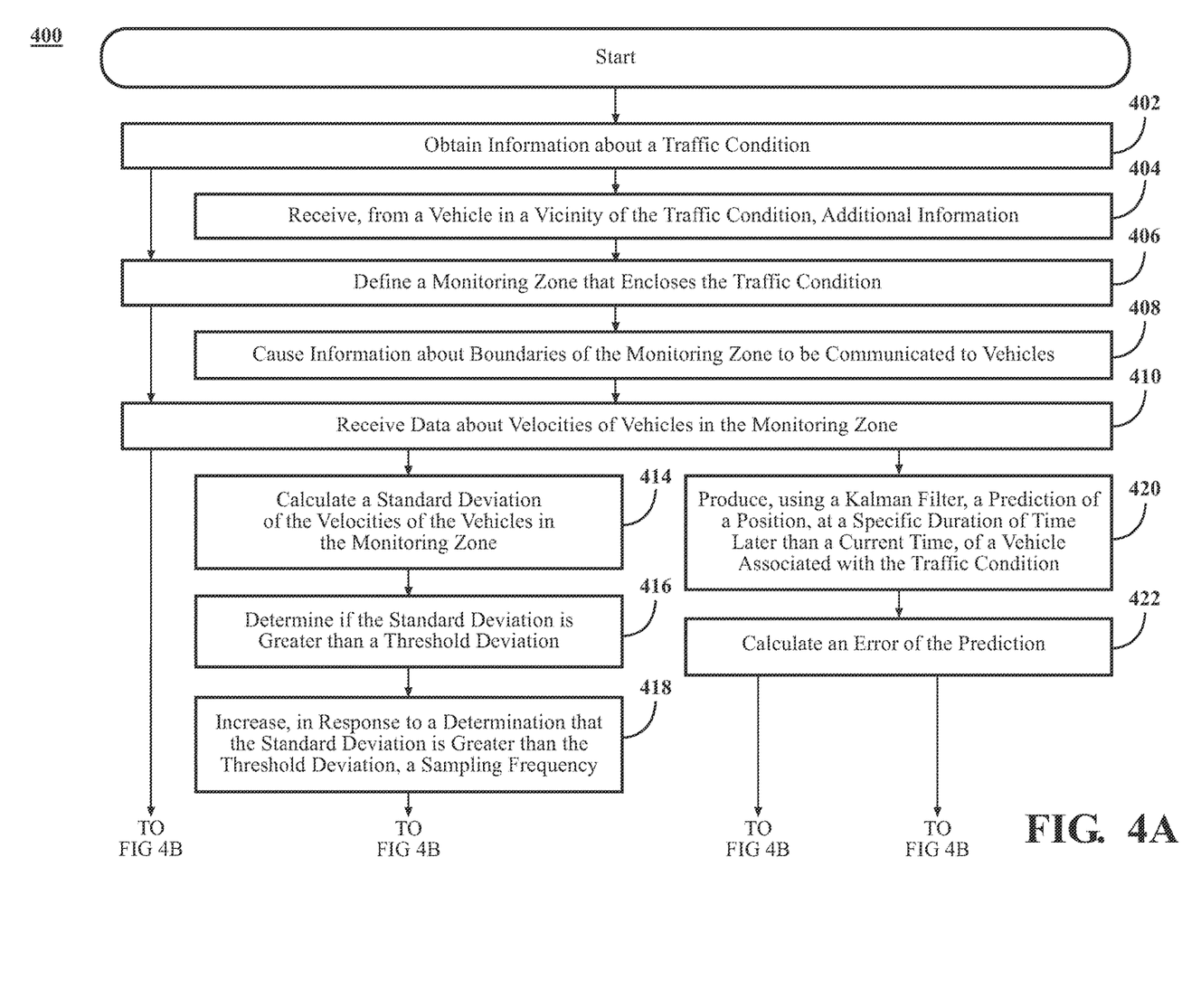
FIGS. 4A and 4B are a flow diagram that illustrates an example of a method that is associated with monitoring a traffic condition, according to the disclosed technologies.
Figure 4B:
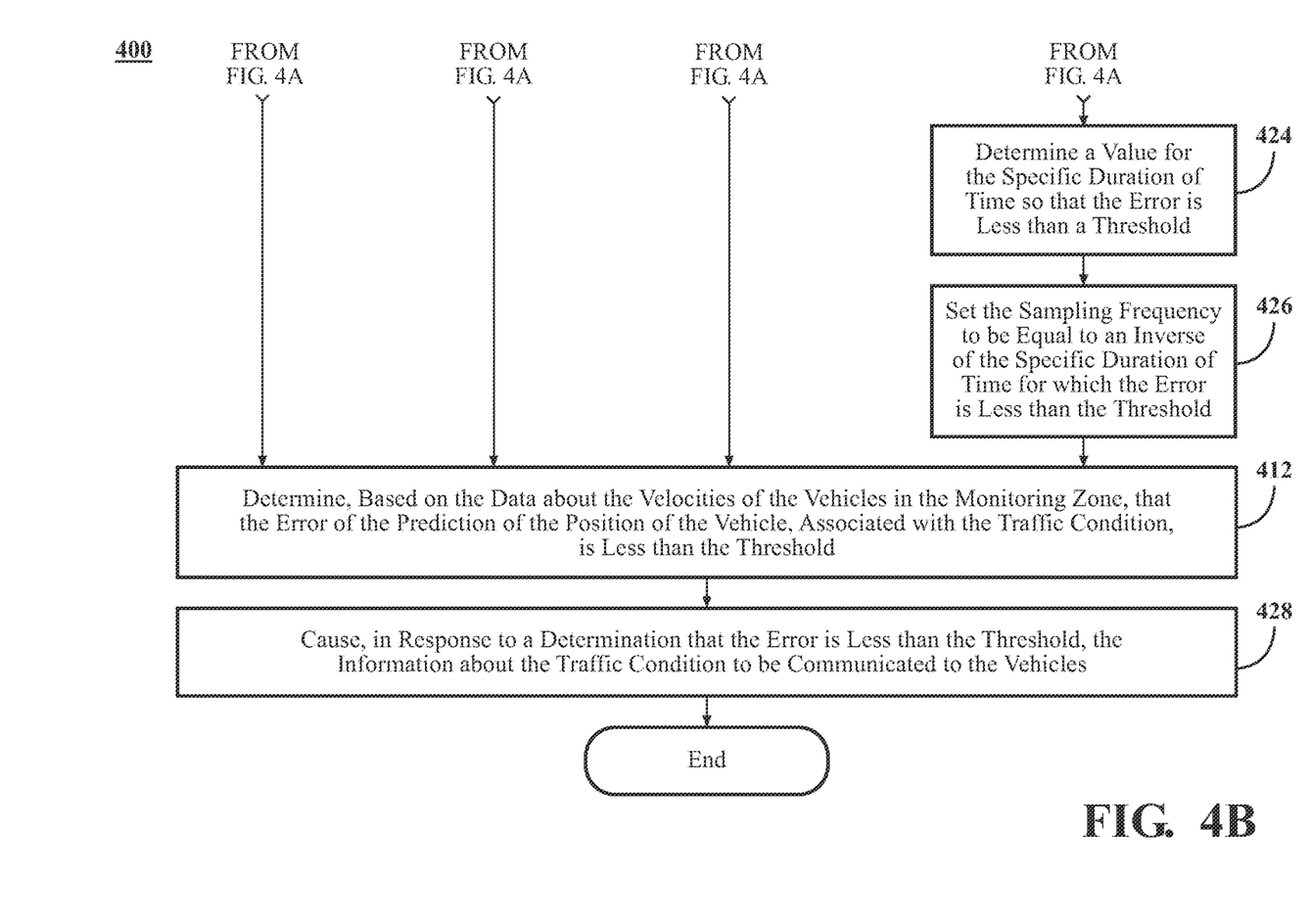

FIGS. 4A and 4B are a flow diagram that illustrates an example of a method 400 that is associated with monitoring a traffic condition, according to the disclosed technologies. Although the method 400 is described in combination with the system 200 illustrated in FIG. 2, one of skill in the art understands, in light of the description herein, that the method 400 is not limited to being implemented by the system 200 illustrated in FIG. 2. Rather, the system 200 illustrated in FIG. 2 is an example of a system that may be used to implement the method 400. Additionally, although the method 400 is illustrated as a generally serial process, various aspects of the method 400 may be able to be executed in parallel.

In FIG. 4A, in the method 400, at an operation 402, for example, the preliminary operations module 206 can obtain information about the traffic condition. The traffic condition can be of stopped or slow moving vehicles.

For example, the information about the traffic condition can be received from a vehicle in a vicinity of the traffic condition. Additionally or alternatively, for example, the information about the traffic condition can be received from another source such as a roadside unit, a loop detector, or the like. Additionally, at an operation 404, for example, the preliminary operations module 206 can receive, from the vehicle in the vicinity of the traffic condition or other source, additional information. The additional information can indicate that a determination, by the vehicle in the vicinity of the traffic condition, of an error of a prediction of a position of another vehicle, associated with the traffic condition, is greater than the threshold.

Alternatively or additionally, for example, the information about the traffic condition can be determined. For example, the information about the traffic condition can be determined by: (1) receiving data about velocities of vehicles in a same lane, (2) determining, based on the data about the velocities of the vehicles in the same lane, if one or more velocities of one or more vehicles, of the vehicles in the same lane, is less than a threshold velocity, and (3) designating, in response to the one or more velocities of the one or more vehicles being less than the threshold velocity, the one or more vehicles as the traffic condition.

Alternatively or additionally, for example, the information about the traffic condition can further be determined by: (1) determining a count of the one or more vehicles designated as the traffic condition and (2) identifying, in response to the count being greater than a threshold count, one or more of: (a) a front vehicle of vehicles associated with the traffic condition or a back vehicle of the vehicles associated with the traffic condition.

At an operation 406, for example, the calculation module 208 can define a monitoring zone that encloses the traffic condition. For example, vehicles associated with the traffic condition can be in a lane of a road having a plurality of lanes for a specific direction of a flow of traffic. The monitoring zone can be defined by setting boundaries that include the plurality of lanes and extend from a front vehicle, of the vehicles associated with the traffic condition, to a distance behind a back vehicle of the vehicles associated with the traffic condition. Additionally, at an operation 408, for example, the communications module 210 can cause information about the boundaries to be communicated to the vehicles. For example, a length of the distance behind the back vehicle can be based on an accuracy of the data received by the system 200. Alternatively, or additionally, for example, the length of the distance behind the back vehicle can be based on a quotient of a first number of vehicles divided by a second number of vehicles. The second number of vehicles can be a count of all the vehicles in the monitoring zone. The first number of vehicles can be a count of all the vehicles in the monitoring zone capable of communicating with the system 200. For example, the quotient can be referred to as a penetration rate.

At an operation 410, for example, the communications module 210 can receive data about velocities of vehicles in the monitoring zone.

In FIG. 4B, in the method 400, at an operation 412, for example, the calculations module 208 can determine, based on the data about the velocities of the vehicles in the monitoring zone, that an error of a prediction of a position of a vehicle, associated with the traffic condition, is less than a threshold.

For example, the data about the velocities of the vehicles in the monitoring zone can be received in signals. For example, the signals can further include: (1) data about positions of the vehicles in the monitoring zone, (2) data about identifications of lanes associated with the positions, and (3) data about times at which the signals were transmitted (e.g., timestamps). Additionally, for example, the signals can further include data about types of the vehicles in the monitoring zone.

For example, the data about the velocities of the vehicles in the monitoring zone can be received from a set of specific vehicles. For example, a position of one or more specific vehicles, of the set of specific vehicles, can be outside of the monitoring zone. For example, the data about the velocities of the vehicles in the monitoring zone can exclude data about one or more vehicles of the vehicles in the monitoring zone. The one or more vehicles can be undetected by any sensor of any of the specific vehicles.

For example, the data about the velocities of the vehicles in the monitoring zone can exclude data about one or more vehicles between a front vehicle, of vehicles associated with the traffic condition, and a back vehicle of the vehicles associated with the traffic condition.

For example, the data about the velocities of the vehicles in the monitoring zone can be received at a sampling frequency.

In FIG. 4A, in the method 400, in a configuration, at an operation 414, for example, the calculations module 208 can calculate a standard deviation of the velocities of the vehicles in the monitoring zone.

At an operation 416, for example, the calculations module 208 can determine if the standard deviation is greater than a threshold deviation.

At an operation 418, for example, the calculations module 208 can increase, in response to a determination that the standard deviation is greater than the threshold deviation, the sampling frequency Additionally, for example, the operation 414, the operation 416, and the operation 418 can be performed in iterations. For example, the iterations can continue until the standard deviation is less than a threshold deviation. For example, the operation 418 can include increasing, for an iteration of the iterations, the sampling frequency by a specific frequency amount.

Alternatively or additionally, in another configuration, at an operation 420, for example, the calculations module 208 can produce, using a Kalman filter, the prediction of the position, at a specific duration of time later than a current time, of the vehicle associated with the traffic condition.

At an operation 422, for example, the calculations module 208 can calculate the error of the prediction.

In FIG. 4B, in the method 400, additionally, at an operation 424, for example, the calculations module 208 can determine a value for the specific duration of time so that the error is less than the threshold.

At an operation 426, for example, the calculations module 208 can set the sampling frequency to be equal to an inverse of the specific duration of time for which the error is less than the threshold.

At an operation 428, for example, the communications module 210 can cause, in response to a determination that the error is less than the threshold, the information about the traffic condition to be communicated to the vehicles.

Figure 5:
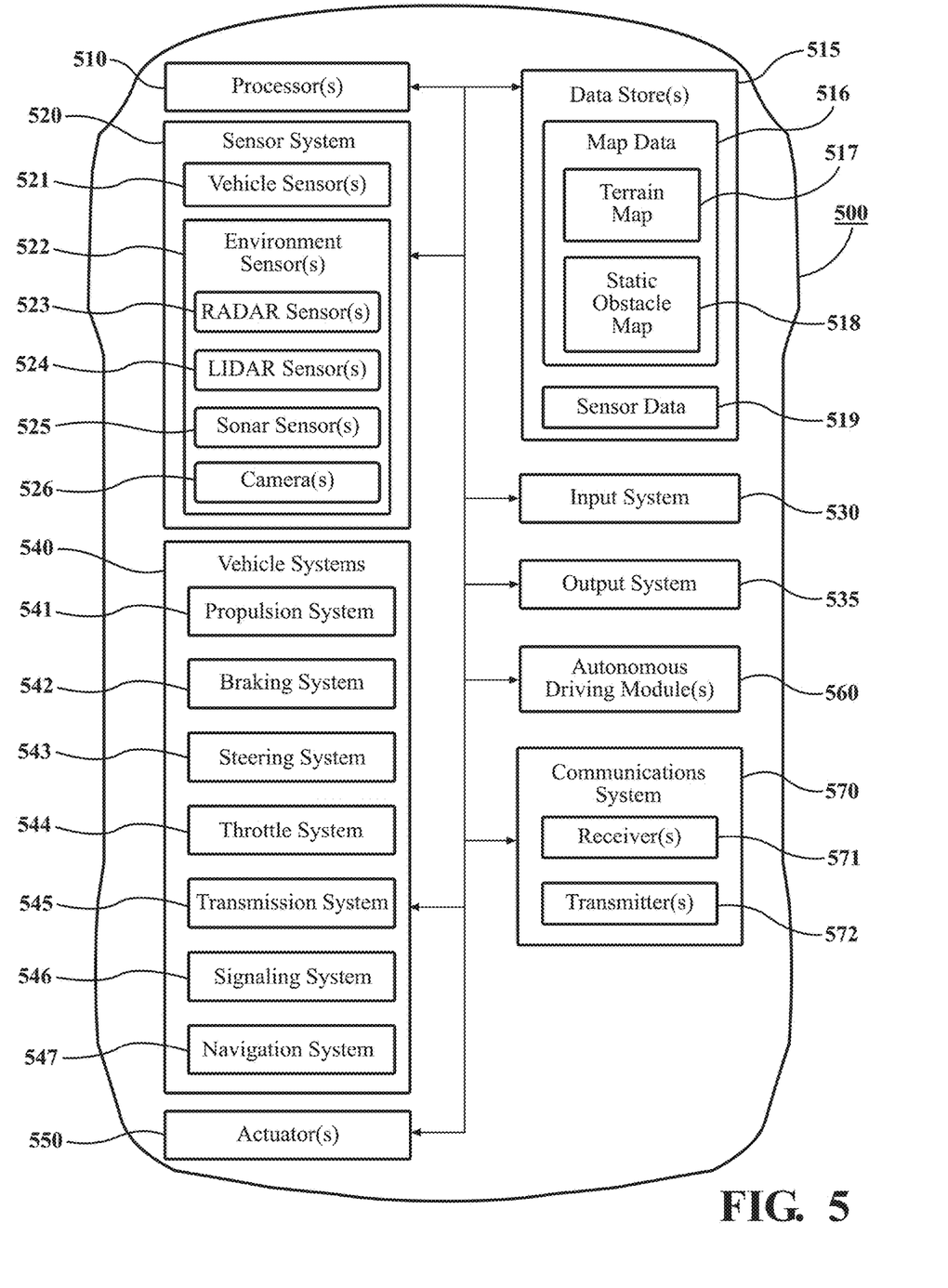
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, and a communications system 570.

In one or more arrangements, the one or more processors 510 can be a main processor of the vehicle 500. For example, the one or more processors 510 can be an electronic control unit (ECU).

The one or more data stores 515 can store, for example, one or more types of data. The one or more data stores 515 can include volatile memory and/or non-volatile memory. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Alternatively or additionally, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500.

Alternatively or additionally, the sensor system 520 can include one or more environment sensors 522 configured to acquire and/or sense driving environment data. For example, functions and/or operations of one or more of the sensors 132 or the sensors 136 (illustrated in FIG. 1) can be realized by the one or more environment sensors 522. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger).

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 570 can include one or more receivers 571 and/or one or more transmitters 572. The communications system 570 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Alternatively or additionally, one or more of the modules can be executed on and/or distributed among other processing systems to which the one or more processors 510 can be operatively connected. The modules can include instructions (e.g., program logic) executable by the one or more processors 510. Alternatively or additionally, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 4A, 4B, and 5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
 a processor; and
 a memory storing:
  a preliminary operations module including instructions that, when executed by the processor, cause the processor to obtain information about a traffic condition of stopped or slow moving vehicles;
  a calculations module including instructions that, when executed by the processor, cause the processor to:
   define a monitoring zone that encloses the traffic condition of stopped or slow moving vehicles;
   determine, based on data about velocities of vehicles in the monitoring zone, that an error of a prediction of a position of a vehicle, within the traffic condition, is less than a threshold; and
   increase, in response to a determination that a standard deviation of the velocities is greater than a threshold deviation, a sampling frequency at which the data are received; and
  a communications module including instructions that, when executed by the processor, cause the processor to:
   receive, at the sampling frequency, the data; and
   cause, in response to a determination that the error is less than the threshold, the information to be communicated to a component of a vehicle for an action controlled by the component, wherein the component comprises at least one of a propulsion system, a braking system, a steering system, a throttle system, a transmission system, or a navigation system.

2. The system of claim 1, wherein:
 the instructions to obtain the information about the traffic condition include instructions to determine the information about the traffic condition, and
 the instructions to determine the information about the traffic condition include instructions to:
  receive data about velocities of vehicles in a same lane;
  determine, based on the data about the velocities of the vehicles in the same lane, if at least one velocity of at least one vehicle, of the vehicles in the same lane, is less than a threshold velocity; and
  designate, in response to the at least one velocity of the at least one vehicle being less than the threshold velocity, the at least one vehicle as the traffic condition.

3. The system of claim 2, wherein the instructions to determine the information about the traffic condition further include instructions to:
 determine a count of the at least one vehicle; and
 identify, in response to the count being greater than a threshold count, at least one of:
  a front vehicle of vehicles associated with the traffic condition, or
  a back vehicle of the vehicles associated with the traffic condition.

4. The system of claim 1, wherein:
 vehicles associated with the traffic condition are in a lane of a road having a plurality of lanes for a specific direction of a flow of traffic,
 the instructions to define the monitoring zone include instructions to set boundaries that include the plurality of lanes and extend from a front vehicle, of the vehicles associated with the traffic condition, to a distance behind a back vehicle of the vehicles associated with the traffic condition, and
 the communications module further includes instructions that, when executed by the processor, cause the processor to cause information about the boundaries to be communicated to the vehicles.

5. The system of claim 4, wherein a length of the distance is based on at least one of:
 an accuracy of the data received by the processor, or
 a quotient of a first number of vehicles divided by a second number of vehicles, the second number of vehicles being a count of all the vehicles in the monitoring zone, the first number of vehicles being a count of all the vehicles in the monitoring zone capable of communicating with the processor.

6. The system of claim 1, wherein:
 the instructions to receive the data about the velocities of the vehicles in the monitoring zone include instructions to receive, in signals, the data about the velocities of the vehicles in the monitoring zone, and
 the signals further include:
  data about positions of the vehicles in the monitoring zone,
  data about identifications of lanes associated with the positions, and
  data about times at which the signals were transmitted.

7. The system of claim 6, wherein the signals further include data about types of the vehicles in the monitoring zone.

8. The system of claim 1, wherein the instructions to receive the data about the velocities of the vehicles in the monitoring zone include instructions to receive, from a set of specific vehicles, the data about the velocities of the vehicles in the monitoring zone.

9. The system of claim 8, wherein a position of at least one specific vehicle, of the set of specific vehicles, is outside of the monitoring zone.

10. The system of claim 8, wherein the data about the velocities of the vehicles in the monitoring zone exclude data about at least one vehicle of the vehicles in the monitoring zone, the at least one vehicle being undetected by any sensor of any of the specific vehicles.

11. The system of claim 1, wherein the data about the velocities of the vehicles in the monitoring zone exclude data about at least one vehicle between a front vehicle, of vehicles associated with the traffic condition, and a back vehicle of the vehicles associated with the traffic condition.

12. The system of claim 1, wherein the calculations module further includes instructions that, when executed by the processor, cause the processor to:
calculate the standard deviation of the velocities of the vehicles in the monitoring zone; and
determine if the standard deviation is greater than the threshold deviation.

13. The system of claim 12, wherein:
the instructions to calculate the standard deviation, the instructions to determine if the standard deviation is greater than the threshold deviation, and the instructions to increase the sampling frequency are performed in iterations, and
the instructions to increase the sampling frequency include instructions to increase, for an iteration of the iterations, the sampling frequency by a specific frequency amount.

14. The system of claim 1, wherein the calculations module further includes instructions that, when executed by the processor, cause the processor to:
produce, using a Kalman filter and at a specific duration of time later than a current time, the prediction of the position of the vehicle associated with the traffic condition; and
calculate the error of the prediction.

15. The system of claim 14, wherein the calculations module further includes instructions that, when executed by the processor, cause the processor to:
determine a value for the specific duration of time so that the error is less than the threshold; and
set the sampling frequency to be equal to an inverse of the specific duration of time for which the error is less than the threshold.

16. A method, comprising:
obtaining, by a processor, information about a traffic condition of stopped or slow moving vehicles;
defining, by the processor, a monitoring zone that encloses the traffic condition of stopped or slow moving vehicles;
receiving, by the processor and at a sampling frequency, data about velocities of vehicles in the monitoring zone;
increasing, in response to a determination that a standard deviation of the velocities is greater than a threshold deviation, the sampling frequency;
determining, by the processor and based on the data, that an error of a prediction of a position of a vehicle, within the traffic condition, is less than a threshold; and
causing, by the processor and in response to a determination that the error is less than the threshold, the information to be communicated to a component of a vehicle for an action controlled by the component, wherein the component comprises at least one of a propulsion system, a braking system, a steering system, a throttle system, a transmission system, or a navigation system.

17. The method of claim 16, wherein the obtaining the information about the traffic condition comprises receiving, from a vehicle in a vicinity of the traffic condition, the information about the traffic condition.

18. The method of claim 17, further comprising receiving, from the vehicle in the vicinity of the traffic condition, additional information that indicates that a determination, by the vehicle in the vicinity of the traffic condition, of an error of a prediction of a position of another vehicle, associated with the traffic condition, is greater than the threshold.

19. A non-transitory computer-readable medium for monitoring a traffic condition, the non-transitory computer-readable medium including instructions that, when executed by one or more processors, cause the one or more processors to:
obtain information about a traffic condition of stopped or slow moving vehicles;
define a monitoring zone that encloses the traffic condition of stopped or slow moving vehicles;
receive, at a sampling frequency, data about velocities of vehicles in the monitoring zone;
increase, in response to a determination that a standard deviation of the velocities is greater than a threshold deviation, the sampling frequency;
determine, based on the data, that an error of a prediction of a position of a vehicle, within the traffic condition, is less than a threshold; and
cause, in response to a determination that the error is less than the threshold, the information to be communicated to a component of a vehicle for an action controlled by the component, wherein the component comprises at least one of a propulsion system, a braking system, a steering system, a throttle system, a transmission system, or a navigation system.

20. The system of claim 1, wherein the instructions to obtain the information about the traffic condition include instructions to determine the information about the traffic condition in a manner that excludes from data received about the vehicles outside of the monitoring zone.

* * * * *